Oct. 29, 1957　　　　　S. G. STENBERG　　　　　2,811,185
DISC CUTTER PROVIDED WITH SEGMENTAL BITS
Filed Oct. 21, 1955　　　　　　　　　　　　　2 Sheets-Sheet 2

Inventor
Sven G. Stenberg
by Sommers & Young
Attorneys

United States Patent Office 2,811,185
Patented Oct. 29, 1957

2,811,185

DISC CUTTER PROVIDED WITH SEGMENTAL BITS

Sven Gösta Stenberg, Nassjo, Sweden

Application October 21, 1955, Serial No. 541,956

3 Claims. (Cl. 144—234)

The present invention relates to rotary wood working tools, such as milling cutters and the like, of the type comprising an annular carrying body having a set of circular borings the axes of which are parallel to the axis of rotation of the carrier and openings in its peripheral surface in communication with said borings, cutting members fitted into said borings, and means for clamping said cutting members in such positions in the borings that their cutting edges project beyond the peripheral surface of the carrier through the openings therein.

The object of the invention is to provide a tool of this type which permits a rapid and easy change of cutting members and a reliable locking of said members in their desired positions.

According to a feature of the invention the cutting members are formed with cylindrical base portions filling up the borings which are rotatably mounted therein as well as with cutting edges projecting beyond the peripheral surface of the carrier through the openings therein, the carrier being formed with threaded borings extending from the peripheral surface of the carrier to inner points of the circumference of the first mentioned, axial borings, for receiving locking means for the cutting members.

According to another feature of the invention the annular carrier of the tool may either comprise a single piece, in the case, for instance, of a planing cutter, or two axially spaced identical elements held at a suitable distance apart, in the case, for instance, of a tongue or groove milling cutter. Preferably, said two elements consist of two annular discs formed with axial borings in register with each other, each pair of such borings being adapted to receive the base portion of a cutting member.

According to a further feature of the invention the locking means for each cutting member comprises a clamping screw in engagement with the respective threaded boring and a slidable block situated in said boring between the inner end of said screw and the respective axial boring which is adapted to be forced against the base portion of the cutting element therein by the action of the clamping screw.

In the accompanying drawings some examples of the invention are shown:

Figure 1:
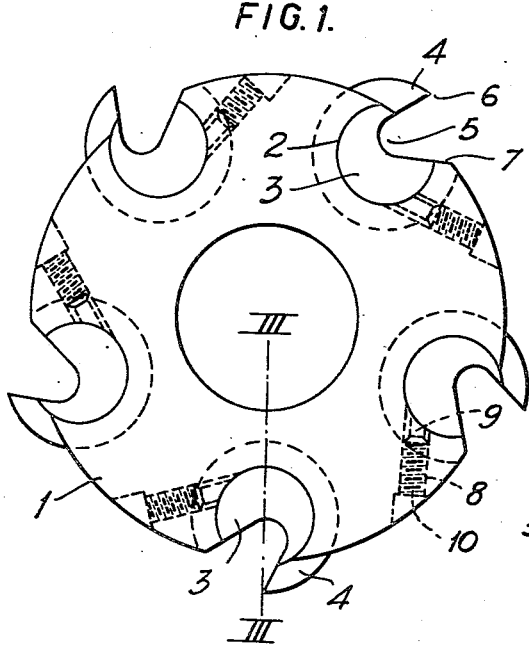
Fig. 1 is an end view.
Figure 2:
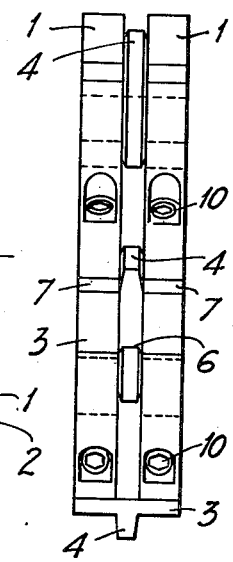
Fig. 2 is a side elevation.
Figure 3:
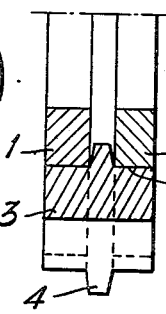
Fig. 3 is an axial section along the line III—III of Fig. 1, of a groove milling cutter.

The groove milling cutter shown in Figs. 1–3 comprises two identical annular discs 1 constituting together the carrier of the cutter. Along their periphery the discs are each formed with a set of cylindrical borings 2 the axes of which are parallel with the common axis of the discs. The borings 2 intersect the peripheral surfaces of the discs, so that they are open along a portion of their circumference corresponding borings of the two discs are adapted to receive a cutting member which for this purpose is formed with a cylindrical base portion 3 to act as a journal. The working portion of the cutting member comprises, in this embodiment, an annular flange 4. The cutting member is recessed, as shown at 5, so as to form an edge 6 and a free space in front thereof. On the side of the recess 5 remote from the cutting edge 6 the carrying discs are formed with bevelled surfaces 7 suited to the respective side of the recess.

In order to maintain the cutting members in the angular position desired in engagement with the borings 2 each disc 1 is formed adjacent each boring 2 with a threaded boring 8 extending from the periphery of the disc to an inner point of the circumference of the boring 2. Said threaded boring 8 contains a slidable block 9 the inner end of which is shaped to suit the circumference of the boring 2 and a screw 10 by the action of which the slidable block may be forced against the base portion of the cutting member in engagement with the boring 2.

In assembling the cutter above described and shown in Figs. 1–3, the cylindrical base portions 3 of the cutting members are introduced into the borings 2 of one disc 1. Then the other disc 1 is pushed onto the base portions from the opposite ends thereof to cause said ends to engage the borings 2 of said other disc. The discs are moved towards each other until they bear against opposite sides of the flanges 4. The cutting members are then adjusted to proper angular positions and locked in said positions by tightening the screws 10.

Figure 4:
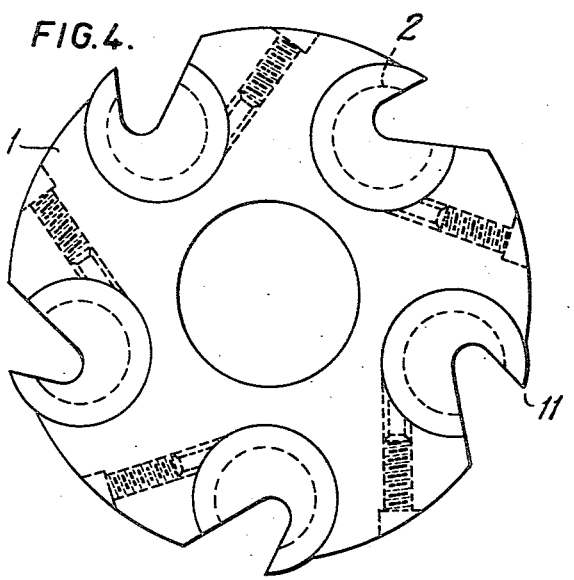
Fig. 4 is an end view.
Figure 5:
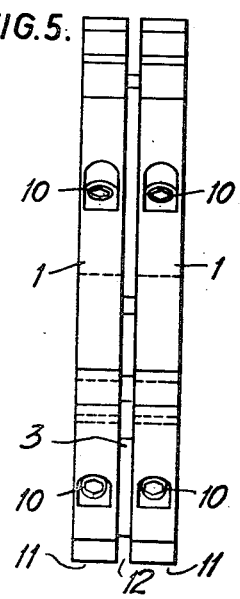
Fig. 5 is a side elevation of a tongue milling cutter.

The tongue milling cutter shown in Figs. 4 and 5 is similar to the groove milling cutter above described, the only difference being that the cutting members are each formed with two axially spaced cutting edges 11 separated by a circumferential groove 12. In this embodiment there is no flange like 4 of the first embodiment for determining the axial spacing of the two discs, and care should be taken to fix the correct axial distance between the discs by other means in connection with the clamping of the discs to the shaft of the cutter.

Figure 6:
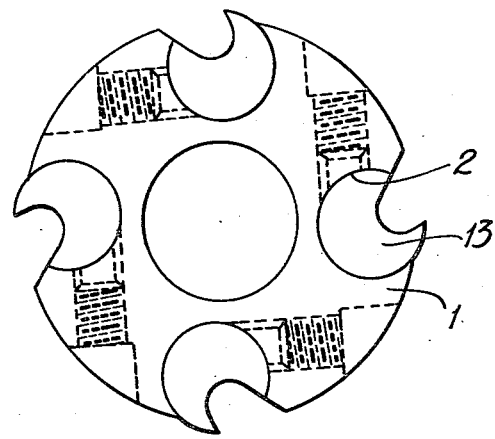
Fig. 6 is an end view.
Figure 7:
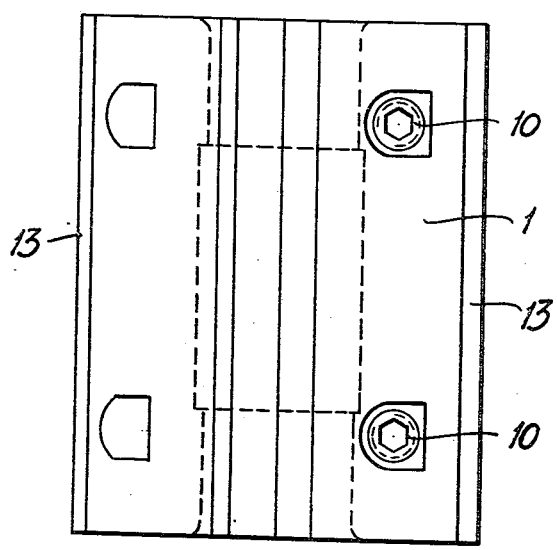
Fig. 7 is a side elevation of a planing cutter.

In the planing cutter shown in Figs. 6 and 7 the carrier consists of a single cylinder-shaped body. The borings 2 therein extend from one end of said body to the other, and so do the cutting members 13. The carrier is provided with two clamping screws 10 for each cutting member. The number of clamping screws depends, of course, on the axial length of the cutter.

I claim:

1. A disc cutter of the class described comprising in combination, a disc-shaped cutter head having axially extending borings which are open at the peripheral surface of the cutter head, cutting bits having cylindrical base portions rotatably mounted like journals in said axial borings and having cutting edges projecting beyond the peripheral surface of the carrier through the openings therein, said bits being of an axial length equal to the axial length of the cutter head, and means located in seats in the cutter head so as to be concealed therein, for engaging the base portions of the bits so as to hold them against rotation in the borings of the cutter heads, while allowing adjusting the angular position of the bits in their seats.

2. A disc cutter as claimed in claim 1, characterized by the further feature that the cutter head comprises two identical, axially spaced annular discs formed with axial borings in register with each other for receiving the opposite ends of the cylindrical base portions of the cutting bits.

3. A cutter as claimed in claim 2, characterized by the further feature that the means for locking the base portions of the cutting members against rotation in the axial borings of the discs comprises blocks slidably mounted in oblique threaded borings in the discs and screws engaging said threaded borings for forcing said blocks against the base portions in engagement with the respective axial borings.

References Cited in the file of this patent

UNITED STATES PATENTS

| | | |
|---|---|---|
| 1,209,180 | Lobdell | Dec. 19, 1916 |
| 1,215,755 | Waugh | Feb. 13, 1917 |
| 1,229,837 | Waugh | June 12, 1917 |
| 1,305,650 | Heggen | June 3, 1919 |